(12) United States Patent
Shimono et al.

(10) Patent No.: US 8,530,014 B2
(45) Date of Patent: Sep. 10, 2013

(54) LAMINATE

(75) Inventors: Takeshi Shimono, Osaka (JP); Kenji Ichikawa, Osaka (JP); Takeshi Inaba, Osaka (JP); Yukinori Kamiya, Osaka (JP); Shingo Sakakibara, Osaka (JP); Shigehito Sagisaka, Osaka (JP); Takahiro Kitahara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 517 days.

(21) Appl. No.: 12/412,469

(22) Filed: Mar. 27, 2009

(65) Prior Publication Data

US 2009/0246435 A1    Oct. 1, 2009

(30) Foreign Application Priority Data

Mar. 27, 2008 (JP) .................. 2008-084360
Jul. 1, 2008 (JP) .................. 2008-172304

(51) Int. Cl.
| B32B 1/00 | (2006.01) |
| B32B 1/02 | (2006.01) |
| B32B 1/08 | (2006.01) |
| B32B 27/28 | (2006.01) |
| B32B 27/30 | (2006.01) |
| B32B 27/32 | (2006.01) |
| B32B 27/34 | (2006.01) |

(52) U.S. Cl.
USPC ...... 428/35.7; 428/36.6; 428/36.91; 428/421; 428/422; 428/474.4; 428/475.5; 428/475.8; 428/476.1; 428/476.3; 428/476.9; 428/500; 428/521; 428/523

(58) Field of Classification Search
USPC ............. 428/34.1, 35.7, 36.6, 36.7, 36.8, 428/36.9, 36.91, 421, 422, 474.4, 475.5, 428/475.8, 476.1, 476.3, 476.9, 500, 521, 428/523
See application file for complete search history.

(56) References Cited

U.S. PATENT DOCUMENTS

2007/0219333 A1 * 9/2007 Shimono et al. .............. 526/249

FOREIGN PATENT DOCUMENTS

| EP | 1627731 A1 | 2/2006 |
| EP | 1741732 A1 | 1/2007 |
| EP | 1897686 A1 | 3/2008 |
| WO | 2004098880 A1 | 11/2004 |
| WO | 2006135091 A1 | 12/2006 |

* cited by examiner

Primary Examiner — Walter B Aughenbaugh
(74) Attorney, Agent, or Firm — Sughrue Mion, PLLC

(57) ABSTRACT

The present invention provides a laminate having an environmental cracking resistance for a fuel and a fuel impermeability and, in addition, higher in productivity. The present invention is a laminate including a chlorotrifluoroethylene copolymer layer (C) and a fluorine-free organic material layer (K), wherein the chlorotrifluoroethylene copolymer has a melt flow rate of 15.0 to 40.0 (g/10 minutes) and contains 15.0 to 25.0 mole percent of chlorotrifluoroethylene units relative to all monomer units.

4 Claims, No Drawings

LAMINATE

CROSS-REFERENCE TO RELATED APPLICATIONS

The present application claims priority under 35 U.S.C. §119 to Japanese Patent Application No. 2008-084360, filed Mar. 27, 2008 and Japanese Patent Application No. 2008-172304, filed Jul. 1, 2008, the contents of which are incorporated herein by reference in their entirety.

BACKGROUND OF THE INVENTION

1. Field of the Invention

The present invention relates to a laminate.

2. Description of Related Art

Resin laminates are used as piping materials for transfer of gasoline and like fuels from processability, corrosion resistance, weight reduction and economy points of view, among others. Those resin laminates are required to have an environmental cracking resistance for a fuel and a fuel impermeability.

So far, laminates composed of a chlorotrifluoroethylene copolymer layer and a fluorine-free resin layer (cf. e.g. Patent Document 1) and laminates composed of a chlorotrifluoroethylene copolymer layer, a fluorine-containing ethylenic polymer layer and a fluorine-free resin layer (cf. e.g. Patent Document 2) have been proposed as resin laminates having the environmental cracking resistance for a fuel and the fuel impermeability. However, laminates comparable in the environmental cracking resistance for a fuel and the fuel impermeability and superior in productivity to the laminates mentioned above are demanded.

[Patent Document 1] International Publication WO 2004/098880

[Patent Document 2] International Publication WO 2006/135091

SUMMARY OF THE INVENTION

According to one aspect of the present invention, a laminate having a chlorotrifluoroethylene copolymer layer (C) and a fluorine-free organic material layer (K). The chlorotrifluoroethylene copolymer constituting chlorotrifluoroethylene copolymer layer (C) has a melt flow rate of 15.0 to 40.0 (g/10 minutes) and contains 15.0 to 25.0 mole percent of chlorotrifluoroethylene units relative to all monomer units. The laminate has an environmental cracking resistance for a fuel and a fuel impermeability and, in addition, higher in productivity.

DETAILED DESCRIPTION OF THE INVENTION

Problems which the Invention is to Solve

In view of the above-discussed state of the art, it is an object of the present invention to provide a laminate having the environmental cracking resistance for a fuel and the fuel impermeability and, in addition, higher in productivity.

Means for Solving the Problems

The present invention is a laminate comprising a chlorotrifluoroethylene copolymer layer (C) and a fluorine-free organic material layer (K), wherein the chlorotrifluoroethylene copolymer has a melt flow rate of 15.0 to 40.0 (g/10 minutes) and contains 15.0 to 25.0 mole percent of chlorotrifluoroethylene units relative to all monomer units.

In the following, the invention is described in detail.

A laminate of the invention has a chlorotrifluoroethylene [CTFE] copolymer layer (C) and a fluorine-free organic material layer (K). An improved interlaminar adhesion, the fuel impermeability and the environmental cracking resistance for a fuel of the laminate of the invention are brought about by the CTFE copolymer constituting the layer (C) of the laminate.

As mentioned above, the resin laminate is required to be of high productivity as well. However, the conventional CTFE copolymer layer-based laminate fails to meet the productivity requirement and the fuel impermeability and the environmental cracking resistance for a fuel requirements simultaneously. This is because, since the productivity of the resin laminate can be improved by using, as a material, the CTFE copolymer showing a high melt flow rate [MFR], but such a CTFE copolymer with a high MFR is inferior in the fuel impermeability and the environmental cracking resistance for a fuel as compared with copolymers lower in MFR although it is superior in moldability.

As for the fuel impermeability and the environmental cracking resistance for a fuel requirements as well, the conventional laminates are insufficient to meet both the requirements simultaneously. This is because, generally, CTFE copolymers with a higher CTFE unit content show good fuel impermeability while, contrariwise, the environmental cracking resistance for a fuel becomes poor as the CTFE unit content increases. Therefore, in the conventional laminates, the CTFE unit content is increased and the decrement in the environmental cracking resistance for a fuel as caused thereby is compensated by reducing the MFR.

The present inventors made intensive investigations to find out means for solving such problems that the prior art laminates have and, as a result, found that the environmental cracking resistance for a fuel can be improved while securing a required level of the fuel impermeability when the CTFE unit content in the CTFE copolymer is selected in a very limited range.

Thus, the CTFE copolymer to be used in the laminate of the invention is characterized in that the MFR thereof is 15.0 to 40.0 (g/10 minutes) and, at the same time, the CTFE unit content thereof is 15.0 to 25.0 mole percent of all monomer units; as a result, the laminate of the invention can have all the productivity, the environmental cracking resistance for a fuel and the fuel impermeability features each at a high level.

The CTFE copolymer constituting the layer (C) has an MFR of 15.0 to 40.0 (g/10 minutes). When the MFR is within the above range, good moldability as well as good environmental cracking resistance for a fuel and fuel impermeability can be obtained. A more preferred lower limit to the MFR is 17.0 (g/10 minutes), a more preferred upper limit thereto is 38.0 (g/10 minutes) and a still more preferred upper limit thereto is 37.0 (g/10 minutes).

The MFR is a value obtained by using a melt indexer and measuring the mass of the CTFE copolymer allowed to flow out through the nozzle with the inside diameter of 2 mm and the length of 8 mm at 297° C. under a load of 5 kg for 10 minutes.

The CTFE copolymer contains 15.0 to 25.0 mole percent of CTFE units relative to all monomer units. When the CTFE unit content is within the above range, the copolymer is excellent in fuel impermeability and the environmental cracking resistance for a fuel. A more preferred lower limit to the CTFE unit content is 17.0 mole percent and a still more preferred lower limit thereto is 18.0 mole percent. A more preferred upper limit thereto is 23.0 mole percent.

In the practice of the invention, the contents of the respective monomers in the copolymer are the values obtained by an appropriate combination of the $^{19}$F-NMR and other analyses, more specifically the NMR analysis, the infrared spectrophotometry [IR], the elemental analysis and the fluorescent X ray analysis as employed according to the monomer species.

The CTFE copolymer is preferably one constituted of CTFE units and monomer (A) units derived from a monomer (A) copolymerizable with CTFE (hereinafter such copolymer is sometimes referred to as "CTFE copolymer (I)").

The term "unit" as used herein referring to a certain monomer means that the section which is derived from the monomer and constitutes a part of the molecular structure of a polymer. For example, each "CTFE unit", as mentioned above, is the CTFE-derived section [—CFCl—CF$_2$—] in the molecular structure of the CTFE copolymer. Likewise, each "monomer (A) unit", as mentioned above, is the section resulting from addition of the monomer (A) in the molecular structure of the CTFE copolymer. As used herein, the mole percent for each monomer unit species is the percentage of the monomer from which monomer units of that species are derived, with the total number of moles of those monomers from which all monomer units constituting the molecular chain of the copolymer are derived being taken as 100 mole percent.

The monomer (A) is not particularly restricted but may be any monomer copolymerizable with CTFE. It may comprise one single species or two or more species. It includes TFE, Et, VdF, a fluoroolefin represented by the general formula (i):

$$CX^3X^4=CX^1(CF_2)_nX^2 \qquad (i)$$

(wherein $X^1$, $X^3$ and $X^4$ are the same or different and each represents hydrogen atom or fluorine atom, $X^2$ represents hydrogen atom, fluorine atom or chlorine atom and n represents an integer of 1 to 10), a PAVE represented by the general formula (ii):

$$CF_2=CF—ORf^1 \qquad (ii)$$

(wherein $Rf^1$ represents a perfluoroalkyl group containing 1 to 8 carbon atoms), and alkyl perfluorovinyl ether derivatives represented by the general formula (iii):

$$CF_2=CF—OCH_2—Rf^2 \qquad (iii)$$

(wherein $Rf^2$ is a perfluoroalkyl group containing 1 to 5 carbon atoms), among others.

The monomer (A) preferably comprises at least one species selected from a group consisting of TFE, Et, VdF, fluoroolefin represented by the general formula (i), and PAVE represented by the general formula (ii).

The monomer (A) may comprise one single species or a combination of two or more species each of the fluoroolefin represented by the general formula (i), PAVE represented by the general formula (ii), and/or alkyl perfluorovinyl ether derivative of general formula (iii).

The fluoroolefin represented by the general formula (i) is not particularly restricted but includes, among others, HFP, perfluoro(1,1,2-trihydro-1-hexene), perfluoro(1,1,5-trihydro-1-pentene) and a (perfluoroalkyl)ethylene represented by the general formula (iv):

$$H_2C=CX^5Rf^3 \qquad (iv)$$

(wherein $X^5$ is H, F or $CF_3$ and $Rf^3$ is a perfluoroalkyl group containing 1 to 10 carbon atoms).

Preferred as the (perfluoroalkyl)ethylene is (perfluorobutyl)ethylene.

As PAVE represented by the general formula (ii), there may be mentioned perfluoro(methyl vinyl ether) [PMVE], perfluoro(ethyl vinyl ether) [PEVE], perfluoro(propyl vinyl ether) [PPVE] and perfluoro(butyl vinyl ether), among others, and PMVE, PEVE or PPVE is preferred.

Preferred as the alkyl perfluorovinyl ether derivative represented by the general formula (iii) are those in which $Rf^2$ is a perfluoroalkyl group containing 1 to 3 carbon atoms. $CF_2=CF—OCH_2—CF_2CF_3$ is more preferred.

Also usable as the monomer (A) is an unsaturated carboxylic acid copolymerizable with CTFE.

The unsaturated carboxylic acid copolymerizable with CTFE is not particularly restricted but includes unsaturated aliphatic carboxylic acids containing 3 to 6 carbon atoms, also including unsaturated aliphatic polycarboxylic acids containing 3 to 6 carbon atoms, such as, for example, (meth) acrylic acid, crotonic acid, maleic acid, fumaric acid, itaconic acid, citraconic acids, mesaconic acid and aconitic acid.

The unsaturated aliphatic polycarboxylic acids are not particularly restricted but include, among others, maleic acid, fumaric acid, itaconic acid, citraconic acid, mesaconic acid and aconitic acid, and the acid anhydrides thereof when they can take an acid anhydride form, such as maleic acid, itaconic acid and citraconic acid.

While the monomer (A) may comprise two or more species, the combined use of itaconic acid, citraconic acid, and/or the acid anhydride thereof may not be necessary when one of the species comprises VdF, a PAVE or HFP.

The CTFE copolymer (I) is composed of 15.0 to 25.0 mole percent of CTFE units and 85.0 to 75.0 mole percent of monomer [A] units, preferably 17.0 to 23.0 mole percent of CTFE units and 83.0 to 77.0 mole percent of monomer [A] units, more preferably 18.0 to 23.0 mole percent of CTFE units and 82.0 to 77.0 mole percent of monomer [A] units.

The CTFE copolymer is preferably a CTFE copolymer constituted of CTFE units, TFE units and monomer (M) units derived from a monomer (M) copolymerizable with CTFE and TFE (hereinafter such copolymer is sometimes referred to as "CTFE copolymer (II)".

Each "TFE unit" so referred to herein is the segment [—CF$_2$—CF$_2$—] derived from TFE and occurring in the molecular structure of the CTFE copolymer (II). Similarly, each "monomer (M) unit" is the segment derived from the monomer (M) by addition thereof to the molecular structure of the CTFE copolymer.

The monomer (M) is not particularly restricted but may be any monomer copolymerizable with CTFE and TFE. As examples, there may be mentioned those enumerated hereinabove referring to the monomer (A), excluding TFE.

The monomer (M) preferably comprises at least one species selected from the group consisting of Et, VdF, a fluoroolefin represented by the general formula (i) and a PAVE represented by the general formula (ii) given hereinabove.

In the CTFE copolymer (II), CTFE units and TFE units, in total, preferably account for 90.0 to 99.9 mole percent, and monomer (M) units for 10.0 to 0.1 mole percent. When the monomer (M) unit content is below 0.1 mole percent, the moldability, the environmental stress cracking resistance and the environmental cracking resistance for a fuel tend to become inferior and, when it is in excess of 10.0 mole percent, the productivity, the fuel impermeability, the heat resistance and the mechanical properties tend to become inferior.

The CTFE unit content is preferably 15.0 to 30.0 mole percent of the sum of CTFE units and TFE units. When the CTFE unit content relative to the sum of CTFE units and TFE units is lower than 15.0 mole percent, the fuel impermeability may become insufficient and, when it is in excess of 30.0 mole percent, the environmental cracking resistance for a fuel and the flexibility may become decreased and the productivity may lower. A more preferred lower limit is 17.0 mole percent, a still more preferred lower limit is 19.0 mole percent, a more preferred upper limit is 26.0 mole percent, and a still more preferred upper limit is 24.0 mole percent.

When the monomer (M) is a PAVE, a more preferred lower limit to the monomer (M) unit content is 0.5 mole percent, a more preferred upper limit thereto is 5 mole percent.

When the term "CTFE copolymer" is used herein without adding such a symbol (I) or (II), the term includes, within the meaning thereof, both the CTFE copolymers (I) and the CTFE copolymers (II).

The CTFE copolymer constituting the layer (C) may be a binary copolymer or a terpolymer or further multicomponent copolymer. As the binary copolymer, there may be mentioned a CTFE/TFE copolymer, a CTFE/PAVE copolymer, a CTFE/VdF copolymer, and a CTFE/HFP copolymer, among others. As the terpolymer (ternary polymer) and further multicomponent copolymers, there may be mentioned a CTFE/TFE/HFP copolymer, a CTFE/TFE/VdF copolymer, a CTFE/TFE/PAVE copolymer, a CTFE/TFE/HFP/PAVE copolymer and a CTFE/TFE/VdF/PAVE copolymer, among others. Among them, the CTFE/TFE/PAVE copolymer is preferred.

The CTFE copolymer mentioned above may be a copolymer of CTFE and Et and/or a fluoromonomer. As the CTFE copolymer having such a copolymer composition, there may be mentioned, for example, a CTFE/Et copolymer, a CTFE/TFE/Et copolymer and a CTFE/TFE/Et/PAVE copolymer.

The above CTFE copolymer can be obtained by any of the polymerization methods known in the art, for example a solution polymerization, an emulsion polymerization and a suspension polymerization. However, it is preferably one obtained by the suspension polymerization from an industrial viewpoint.

The CTFE copolymer preferably has a melting point [Tm] of 150 to 280° C. A more preferred lower limit is 160° C., a still more preferred lower limit is 170° C., a particularly preferred upper limit is 190° C., and a more preferred upper limit is 260° C.

The melting point [Tm] is a temperature corresponding to a melting peak as observed upon raising a temperature at a rate of 10° C./minute using a differential scanning calorimeter [DSC].

The CTFE copolymer mentioned above, when subjected to a heating test, preferably shows a temperature [Tx] of not lower than 370° C. at which 1% by mass of the CTFE copolymer is decomposed. A more preferred lower limit is 380° C. and a still more preferred lower limit is 390° C. Within the above range, an upper limit to the above-defined thermal decomposition temperature [Tx] may be set at 450° C., for instance.

The thermal decomposition temperature [Tx] is a value obtained by using an apparatus for thermogravimetry/differential thermal analyzer [TG-DTA] and measuring a temperature at which a loss in mass of the CTFE copolymer subjected to the heating test amounts to 1% by mass.

The above CTFE copolymer preferably shows a difference [Tx−Tm] of 130° C. or greater between the melting point [Tm] and the temperature [Tx] causing 1% by mass decomposition of the CTFE copolymer. When such difference is smaller than 130° C., the temperature range within which molding is possible becomes so narrow that the range of choice of molding conditions becomes narrow. Because of its broad temperature range within which a molding is possible, as mentioned above, the CTFE copolymer mentioned above, when subjected to a coextrusion molding, can be coextruded with a high-melting-point polymer as a counterpart.

In the case of melt molding or heat treatment at a temperature lower than 320° C., the CTFE copolymer of the invention preferably contains an adhesive functional group or groups. The term "adhesive functional group" as used herein means a group which constitutes a part of the molecular structure of a polymer contained in the CTFE copolymer and is capable of participating in an adhesion between the layer (C) comprising the CTFE copolymer and a layer adjacent to the layer (C). The adhesive functional group may be any moiety capable of being involved in such an adhesion and includes, within the meaning thereof, those generally called functional groups but also those generally called bonds such as ether bonding.

The adhesive functional group is not particularly restricted but may be any of those capable of being involved in the adhesion between the layer (C) and the layer adjacent to the layer (C), including carbonyl, hydroxyl and amino group, among others.

The "carbonyl group" so referred to herein is a divalent carbon-containing group comprising a carbon-oxygen double bond, typically the group represented by —C(=O)—. The carbonyl group is not particularly restricted but may be, for example, a carbonate group, a haloformyl group, formyl group, carboxyl group, ester bond [—C(=O)O—], an acid anhydride bond [—C(=O)O—C(=O)—], isocyanato group, amide group, imide group [—C(=O)—NH—C(=O)—], urethane bond [—NH—C(=O)O—], carbamoyl group [NH$_2$—C(=O)—], carbamoyloxy group [NH$_2$—C(=O)O—], ureido group [NH$_2$—C(=O)—NH—] or oxamoyl group [NH$_2$—C(=O)—C(=O)—], or the like one containing —C(=O)— as a part of the chemical structure.

The amide group mentioned above is a group represented by the general formula:

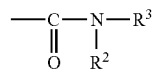

(wherein $R^2$ represents hydrogen atom or an organic group and $R^3$ represents an organic group).

The hydrogen atom or atoms each bound the nitrogen atom in the above-mentioned amide group, imide group, urethane bond, carbamoyl group, carbamoyloxy group, ureido group or oxamoyl group, for instance, each may be substituted by a hydrocarbon group such as an alkyl group.

Preferred as the adhesive functional group are amide, carbamoyl, hydroxyl, carboxyl and carbonate groups since these are easy to introduce and the coatings obtained show a proper heat resistance and a good adhesion at relatively low temperatures; among them, carbonate groups are preferred.

The above-mentioned carbonate group is represented by —OC(=O)O—R (in which R represents an organic group). As the organic group R in the above formula, there may be mentioned, for example, an alkyl group containing 1 to 20 carbon atoms, an ether bond-containing alkyl group containing 2 to 20 carbon atoms, etc.; among them, an alkyl group containing 1 to 8 carbons, an ether bond-containing alkyl group containing 2 to 4 carbon atoms and the like are preferred. For example, —OC(=O)OCH$_3$, —OC(=O)OC$_3$H$_7$, —OC(=O)OC$_8$H$_{17}$, —OC(=O)OCH$_2$CH$_2$CH$_2$OCH$_2$CH$_3$ and the like may be mentioned as preferred examples.

When the CTFE copolymer is an adhesive functional group-containing one, the copolymer may comprise a polymer containing the adhesive functional group or groups at one or each main chain terminus or on one or more side chains or a polymer containing such groups at one or each main chain terminus and in one or more side chains. When the polymer main chain is an adhesive functional group-terminated one, each of the both termini of the main chain may have such groups, or only either one of the termini may have such groups. When the CTFE copolymer contains such an adhesive functional group or groups as mentioned above at one or each main chain terminus and/or in a side chain(s) and/or contains an adhesive functional group or groups each in the structural form generally called a bond such as an ether bond, such an adhesive functional group or groups may be contained in the main chain. That the CTFE copolymer comprises a polymer whose main chain is the adhesive functional group-terminated one is preferred for a reason that such a group or groups will not markedly lower the mechanical properties or a chemical resistance of the copolymer and for reasons of advantageousness from the productivity and cost viewpoint.

The CTFE copolymer which comprises a polymer having adhesive functional group-containing side chains can be obtained by copolymerizing adhesive functional group-containing monomer with
CTFE monomer and the monomer (A), or, with CTFE monomer, TFE monomer and the monomer (M). The term "adhesive functional group-containing monomer" as used herein means a polymerizable monomer containing the adhesive functional group. The adhesive functional group-containing monomer may or may not contain a fluorine atom(s). Since, however, the above-mentioned monomer (A) and monomer (M) have no adhesive functional group and, in this respect, are conceptually distinguished from the adhesive functional group-containing monomer which has the adhesive functional group.

Preferred as the adhesive functional group-containing monomer is unsaturated compound represented by the general formula (v):

$$CX^6_2=CY^1-(R^1)_n-Z^1 \quad (v)$$

wherein $Z^1$ represents a hydroxyl-, carbonyl- or amino group-containing functional group, $X^6$ and $Y^1$ are the same or different and each represents hydrogen atom or fluorine atom, $R^1$ represents an alkylene group containing 1 to 40 carbon atoms, an oxyalkylene group containing 1 to 40 carbon atoms, an ether bond-containing alkylene group containing 2 to 40 carbon atoms or an ether bond-containing oxyalkylene group containing 2 to 40 carbon atoms, in each of which a part or all of the hydrogen atoms may be substituted by a fluorine atom or atoms, and n represents 0 or 1. By saying "hydroxyl, carbonyl or amino group-containing functional group" herein, it is meant that the functional group in question may be hydroxyl group or carbonyl group or amino group or a functional group containing any of these adhesive functional groups.

When the adhesive functional group is a carbonyl group-containing one, the above-mentioned adhesive functional group-containing monomer includes, among others, such a fluoromonomer as perfluoroacryloyl fluoride, 1-fluoroacryloyl fluoride, acryloyl fluoride, 1-trifluoromethacryloyl fluoride and perfluorobutenoic acid; and such a fluorine-free monomer as acryloyl chloride and vinylene carbonate.

The above-mentioned adhesive functional group-containing monomer further includes unsaturated carboxylic acids. The unsaturated carboxylic acids as adhesive functional group-containing monomers, as so referred to herein, are preferably those ones which have at least one carbon-carbon unsaturated bond enabling copolymerization thereof (hereinafter also referred to as "copolymerizable carbon-carbon unsaturated bond") per molecule and further have at least one carbonyloxy group [—C(=O)—O—] per molecule.

As the above-mentioned unsaturated carboxylic acids, there may be mentioned, for example, aliphatic unsaturated carboxylic acids and acid anhydrides thereof. The aliphatic unsaturated carboxylic acids may be aliphatic unsaturated monocarboxylic acids or aliphatic unsaturated polycarboxylic acids containing two or more carboxyl groups.

As the aliphatic unsaturated monocarboxylic acids, there may be mentioned aliphatic monocarboxylic acids containing 3 to 20 carbon atoms, for example propionic acid, acrylic acid, methacrylic acid, crotonic acid, and the anhydrides thereof. As the aliphatic unsaturated polycarboxylic acids, there may be mentioned maleic acid, fumaric acid, mesaconic acid, citraconic acid [CAC], itaconic acid, aconitic acid, itaconic anhydride [IAH] and citraconic anhydride [CAH], among others.

Among the adhesive functional groups, those occurring at a main chain terminus (hereinafter also referred to as "unstable terminal groups") include the carbonate group, —COF, —COOH, —COOCH$_3$, —CONH$_2$, —CH$_2$OH and the like. Such unstable terminal groups are generally formed at a main chain terminus upon addition of the chain transfer agent or the polymerization initiator used on the occasion of polymerization and each is derived from the structure of the chain transfer agent or polymerization initiator.

The CTFE copolymer, when it comprises the polymer whose main chain is an adhesive functional group-terminated one in which the adhesive functional group is a carbonate group, can be obtained by a method of polymerization using a peroxycarbonate as the polymerization initiator. The use of such method is preferred in view of a fact that the carbonate group introduction and a control of such introduction are very easy to make and also from an economic viewpoint and from a viewpoint of the quality, including the heat resistance and the chemical resistance, among others.

Preferred as the peroxycarbonate is compound represented by one of the following formulas:

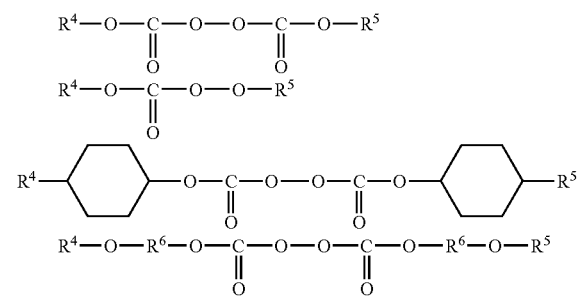

(In the above formulas, $R^4$ and $R^5$ are the same or different and each represents a straight or branched monovalent saturated hydrocarbon group containing 1 to 15 carbon atoms or an alkoxyl group-terminated straight or branched monovalent saturated hydrocarbon group containing 1 to 15 carbon atoms, and $R^6$ represents a straight or branched divalent saturated hydrocarbon group containing 1 to 15 carbon atoms or an alkoxyl group-terminated straight or branched divalent saturated hydrocarbon group containing 1 to 15 carbon atoms.)

Preferred as the peroxycarbonate, among others, is diisopropyl peroxycarbonate, di-n-propyl peroxydicarbonate, tert-butylperoxy isopropyl carbonate, bis(4-tert-butylcyclohexyl) peroxydicarbonate and di-2-ethylhexyl peroxydicarbonate.

When the CTFE copolymer comprises the polymer whose main chain is the adhesive functional group-terminated one in which the adhesive functional group is other than a carbonate group, a peroxide-derived adhesive functional group can be introduced therein, like in the case of the above-mentioned carbonate group introduction, by carrying out a polymerization using such a peroxide as a peroxycarbonate, peroxydicarbonate, peroxy ester or peroxyalcohol as the polymerization initiator. By saying "peroxide-derived", it is meant that the functional group in question is introduced directly from the functional group contained in the peroxide or indirectly by conversion of the functional group introduced directly from the functional group contained in the peroxide.

A level of addition of the polymerization initiator such as a peroxycarbonate or peroxy ester is preferably 0.05 to 5 parts by mass per 100 parts by mass of the polymer to be obtained, although it may vary depending on the kind, composition and molecular weight of a desired CTFE copolymer, the polymerization conditions and the initiator species used, among others. A more preferred lower limit is 0.1 part by mass, and a more preferred upper limit is 1 parts by mass.

The number of adhesive functional groups can be properly selected according to the differences, among others, in the kind and shape of the counterpart material for lamination, a purpose of adhesion, an intended use, a bond strength required and a method of bonding the CTFE copolymer layer (C) to the adjacent layer.

In the case of melt molding at a molding temperature lower than 320° C., the number of unstable terminal groups preferably 3 to 800 per $1 \times 10^6$ carbon atoms in the main chain. When that number is not larger than 3 per $1 \times 10^6$ carbon atoms, the adhesiveness may decrease in certain cases. A more preferred lower limit is 50, a still more preferred lower limit is 80, and a particularly preferred lower limit is 120. When the number of unstable terminal groups is within the above range in the case of melt molding at a molding temperature lower than 320° C., an upper limit may be set, for example, at 500 from the productivity viewpoint.

The number of unstable terminal groups is the number obtained by a compression molding the CTFE copolymer in a powder form at a molding temperature higher by 50° C. than the melting point thereof and at a molding pressure of 5 MPa, subjecting the thus-obtained film sheet with the thickness of 0.25 to 0.30 mm to infrared absorption spectrometry [IR], determining the species by comparison with the infrared absorption spectra for known films and making a calculation based on a differential spectrum thereof according to the following formula:

Number of terminal groups(per$10^6$carbon atoms)=($l \times K$)/$t$ where:
l: Absorbance
K: Correction factor
T: Film thickness (mm)

The correction factors for the terminal groups in question are shown in Table 1.

TABLE 1

| Terminal group | Absorption wave number (cm$^{-1}$) | Correction factor |
|---|---|---|
| —OC(=O)O—R | 1817 | 1426 |
| —COF | 1884 | 405 |
| —COOH | 1813, (1795-1792), 1775 | 455 |
| —COOCH$_3$ | 1795 | 355 |
| —CONH$_2$ | 3438 | 408 |
| —CH$_2$OH | 3648 | 2325 |

The correction factors given in Table 1 are the values determined from the infrared absorption spectra of model compounds for calculating the number of corresponding terminal groups per $1 \times 10^6$ carbon atoms in the main chain.

A laminate of the invention may further comprise a fluorine-containing ethylenic polymer layer (J). The fluorine-containing ethylenic polymer constituting the layer (J), so referred to herein, does not include any CTFE copolymer. As the fluorine-containing ethylenic polymer layer (J), there may be mentioned a layer (P) comprising a perhalogenated fluorine-containing ethylenic polymer other than the CTFE copolymer and a layer (F) comprising a non-perhalogenated fluorine-containing ethylenic polymer other than the CTFE copolymer.

When it has the layer (P) made of a perhalogenated fluorine-containing ethylenic polymer other than the CTFE copolymer, the laminate of the invention is excellent in the chemical resistance and the heat resistance.

As the perhalogenated fluorine-containing ethylenic polymer, there may be mentioned a copolymer (III) composed at least of TFE units and perfluoro monomer units derived from a perfluoro monomer represented by the general formula (vi):

$$CF_2=CF-Rf^5 \qquad (vi)$$

wherein Rf$^5$ represents CF$_3$ or ORf$^6$ in which Rf$^6$ represents a perfluoroalkyl group containing 1 to 5 carbon atoms. The perfluoro monomer units may be ones derived from one species or two or more species.

As the perhalogenated fluorine-containing ethylenic polymer, there may be mentioned PCTFE as well.

As the copolymer (III), there may be mentioned, for example:
(III-I) A copolymer having a TFE unit content of 70 to 95 mole percent, preferably 85 to 93 mole percent, and an HFP unit content of 5 to 30 mole percent, preferably 7 to 15 mole percent;
(III-II) A copolymer having a TFE unit content of 70 to 95 mole percent and a PAVE unit content of 5 to 30 mole percent, wherein the PAVE unit content is the total content of units derived from one or two or more PAVE species represented by the general formula (vii):

$$CF_2=CF-ORf^7 \qquad (vii)$$

(wherein Rf$^7$ represents a perfluoroalkyl group containing 1 to 5 carbon atoms); and
(III-III) A copolymer having a TFE unit content of 70 to 95 mole percent and a sum of the HFP unit content and PAVE unit content of 5 to 30 mole percent, wherein the PAVE unit content is of one PAVE unit species or of two or more PAVE unit species.

The PAVE unit may be of one species or of two or more species.

Such copolymers (III) as mentioned above are not particularly restricted but, for example, one of them may be used singly or two or more of them may be used in combination.

When it has the layer (F) made of a non-perhalogenated fluorine-containing ethylenic polymer other than the CTFE copolymer, the laminate of the invention is excellent in the adhesiveness and the melt processability.

As the non-perhalogenated fluorine-containing ethylenic polymer, there may be mentioned a copolymer (IV) composed at least of TFE units and Et units.

As the non-perhalogenated fluorine-containing ethylenic polymer, there may further be mentioned a copolymer (V) composed at least of VdF units.

As the copolymer (IV), there may be mentioned, for example, a polymer having a TFE unit content of 20 mole percent or higher and, as such, there may be mentioned, for example, copolymers composed of 20 to 80 mole percent of TFE units, 20 to 80 mole percent of Et units and 0 to 60 mole percent of units derived from a monomer(s) copolymerizable therewith.

As the above copolymerizable monomer, there may be mentioned, for example, a fluoroolefin represented by the general formula (viii):

$$CX^9X^{10}=CX^7(CF_2)_nX^8 \quad \text{(viii)}$$

(wherein $X^7$, $X^9$ and $X^{10}$ are the same or different and each represents hydrogen or fluorine atom, $X^8$ represents hydrogen, fluorine or chlorine atom and n represents an integer of 1 to 10) and PAVE represented by the general formula (ix):

$$CF_2=CF-ORf^8 \quad \text{(ix)}$$

(wherein $Rf^8$ represents a perfluoroalkyl group containing 1 to 5 carbon atoms). These may be used singly or two or more of them may be used in combination.

Preferred among the copolymer (IV) is a copolymer composed of 0 to 60 mole percent of the sum of fluoroolefin units derived from a fluoroolefin (s) represented by the above general formula (viii) and/or PAVE units derived from a PAVE(s) represented by the above general formula (ix), 20 to 80 mole percent of TFE units and 20 to 80 mole percent of Et units.

As such copolymers, there may be mentioned, for example:

(IV-I) A Copolymer composed of 30 to 70 mole percent of TFE units, 20 to 55 mole percent of Et units and 0 to 10 mole percent of fluoroolefin units derived from a fluoroolefin(s) represented by the above general formula (viii);

(IV-II) A Copolymer composed of 30 to 70 mole percent of TFE units, 20 to 55 mole percent of Et units, 1 to 30 mole percent of HFP units and 0 to 10 mole percent of units derived from a monomer(s) copolymerizable therewith;

(IV-III) A Copolymer composed of 30 to 70 mole percent of TFE units, 20 to 55 mole percent of Et units and 0 to 10 mole percent of PAVE units derived from a PAVE (s) represented by the above general formula (ix);

and so forth.

The copolymers (IV) mentioned above may contain or may not contain those copolymer (IV)-constituting units derived from the copolymerizable monomer(s), including the cases where they are fluoroolefin units derived from a fluoroolefin (s) represented by the general formula (viii) and/or units derived form a PAVE(s) represented by the general formula (ix).

As the copolymer (V), there may be mentioned polymers having a VdF unit content of 10 mole percent or higher. Preferred as such are, for example, copolymers composed of 15 to 100 mole percent of VdF units, 0 to 85 mole percent of TFE units and 0 to 30 mole percent of the sum of HFP units and/or chlorotrifluoroethylene units.

As the copolymer (V), there may be mentioned, for example:

(V-I) A vinylidene fluoride homopolymers (hereinafter sometimes referred to as poly(vinylidene fluoride) [PVdF]);

(V-II) A copolymer composed of 30 to 99 mole percent of VdF units and 1 to 70 mole percent of TFE units;

(V-III) A copolymer composed of 10 to 90 mole percent of VdF units, 0 to 90 mole percent of TFE units and 0 to 30 mole percent of chlorotrifluoroethylene units; and (V-IV) A copolymer composed of 10 to 90 mole percent of VdF units, 0 to 90 mole percent of TFE units and 0 to 30 mole percent of HFP units.

Preferred as the copolymers (V-IV) are copolymers composed of 15 to 84 mole percent of VdF units, 15 to 84 mole percent of TFE units and 0 to 30 mole percent of HFP units.

Among the monomer units constituting the copolymers (III) to (V), those which may amount to 0 (zero) mole percent in the respective copolymers may be contained or may not be contained in the respective copolymers.

The fluorine-containing ethylenic polymer constituting the layer (J) preferably has an MFR of 0.1 to 70 (g/10 minutes). The MFR within the above range renders the laminate excellent in the fuel impermeability and the environmental cracking resistance for a fuel. A more preferred lower limit to the MFR is 1 (g/10 minutes) and a more preferred upper limit thereto is 50 (g/10 minutes).

Two or more fluorine-containing ethylenic polymer species may be used in combination. In the case of combined use of two or more such species, fluorine-containing ethylenic polymers compatible with each other are preferably used since they can form a layer with no sharp dividing line as a result of admixture by melting, hence causing no delamination. The mixing ratio or layer thickness ratio can be adjusted so that the layers as a whole may acquire a preferred fuel permeability coefficient and a preferred melting point.

When the fluorine-containing ethylenic polymer layer (J) is made of two or more fluorine-containing ethylenic polymer species, the compatibility-dependent respective interlayer adhesion can be secured, without introduction of such an adhesive functional group as mentioned above, by feeding the respective polymer species employed, without preliminary mixing, into a coextruding machine or by placing layers separately prepared on top of each other, followed by thermal melting.

When the fluorine-containing ethylenic polymer layer (J) is made of the two or more fluorine-containing ethylenic polymer species, the layer may be made of a polymer alloy prepared in advance by mixing up the respective polymer species.

The fluorine-containing ethylenic polymer or polymers mentioned above may have such adhesive functional groups as mentioned above at main chain terminus or termini thereof or on side chains thereof.

The contents of the above-mentioned respective monomers in the fluorine-containing ethylenic polymer are the values obtained by an appropriate combination of the $^{19}$F-NMR analysis, the infrared spectrophotometry [IR], the elemental analysis and the fluorescent X ray analysis as employed according to the monomer species.

The fluorine-containing ethylenic polymer preferably has a melting point of 130 to 280° C., more preferably 150 to 280° C., from a facilitated coextrusion viewpoint.

The fluorine-containing ethylenic polymer constituting the layer or layers other than a surface to come into contact with a liquid may be a resin- or elastomer-constituting polymer but preferably is a resin-constituting one.

The fluorine-containing ethylenic polymer can be obtained by a polymerization method known in the art, for example by the solution polymerization, the emulsion polymerization or the suspension polymerization. From the industrial viewpoint, it is preferably one obtained by the suspension polymerization.

In the laminate of the invention, the CTFE copolymer and the fluorine-containing ethylenic polymer constituting the respective layers may contain an electrically conductive filler incorporated therein. Incorporation of the conductive filler makes it possible to prevent an accumulation of static charges due to the friction between a fuel and the laminate of the invention and thereby prevent fire or explosion otherwise possibly caused by static electricity discharge and further prevent cracking of or pinhole appearance in the laminate of the invention and a resulting fuel leakage.

The conductive filler is not particularly restricted but includes, among others, metals, carbon and like conductive simple substance powders or conductive simple substance fibers; powders of conductive compounds, for example zinc oxide; and powders surface-treated for rendering the same conductive.

The conductive simple substance powders or conductive simple substance fibers are not particularly restricted but include, among others, copper, nickel and like metal powders; iron, stainless steel and like metal fibers; carbon black, carbon fibers, carbon fibrils described in Japanese Kokai Publication H03-174018, carbon nanotubes and carbon nanohorns.

The powders surface-treated for rendering the same conductive are powders obtained by surface treatment of glass beads, titanium oxide or like nonconductive powders for rendering the same conductive. A method of treatment for rendering them conductive is not particularly restricted but may be, for example, a metal sputtering and a nonelectrolytic plating. Among the conductive fillers mentioned above, carbon black is preferably used since it is advantageous from an economic viewpoint.

When the conductive filler mentioned above is incorporated in any of the polymers constituting the respective layers mentioned above, pellets are preferably prepared in advance by melt kneading.

As for a pellet heating condition after melt kneading in the step of pelletization, a temperature not lower than the glass transition point of the polymer constituting each layer but lower than the melting point of the polymer constituting each layer is generally employed; generally, the pelletization is carried out preferably at 130 to 200° C. for 1 to 48 hours. Preliminary pelletization can result in uniform dispersion of the conductive filler in the polymer in each layer to be obtained and thus provide the layer with a uniform conductivity.

A level of addition of the conductive filler can properly be selected according to the polymer species, a conductive property required of the laminate and a molding condition, among others; preferably, the conductive filler is used in an amount of 1 to 30 parts by mass per 100 parts by mass of the polymer. A more preferred lower limit is 5 parts by mass, and a more preferred upper limit is 20 parts by mass.

The polymer with the conductive filler incorporated therein preferably has a surface resistivity value of $1 \times 10^0$ to $1 \times 10^9$ $\Omega \cdot cm$. A more preferred lower limit is $1 \times 10^2$ $\Omega \cdot cm$, and a more preferred upper limit is $1 \times 10^8$ $\Omega \cdot cm$.

The "surface resistivity value of the polymer with the conductive filler incorporated therein" so referred to herein is the value obtained by measuring, using a battery-powered insulation tester, the surface resistivity value of an extrudate strand obtained by feeding the pellets obtained by melt kneading of the conductive filler and the polymer into a melt indexer and heating them at an any temperature between 200 to 400° C. in the melt indexer, followed by extrusion.

In the CTFE copolymer and the fluorine-containing ethylenic polymer, which constitute the respective layers, there may be added, in addition to the above-mentioned conductive filler, one or more of various additives such as heat stabilizers and other stabilizers, reinforcing agents, fillers, ultraviolet absorbers, and pigments, each at an addition level at which the object of the invention will not be defeated. Each polymer-based layer can be improved in such properties as thermal stability, surface hardness, wear resistance, antistatic property and weathering resistance by addition of such additive or additives.

The laminate of the invention has the layer (K) made of a fluorine-free organic material.

The fluorine-free organic material is an organic material containing no fluorine atom. The fluorine-free organic material is preferably a resin capable of being coextruded with the layer of the fluorine-containing ethylenic polymer.

The fluorine-free organic material is preferably a resin based on a polymer having a high crystallinity and more preferably a resin based on a polymer having high crystallinity, containing a polar functional group and thus showing a great intermolecular force.

The polar functional group is a functional group which has a polarity and can be involved in adhesion between the fluorine-free organic material layer and a adjacent layer. The polar functional group may be the same as the above-mentioned adhesive functional group which the CTFE copolymer has or may be a different functional group.

The polar functional group is not particularly restricted but includes those mentioned hereinabove as the adhesive functional groups and, further, cyano, sulfide and other groups; among them, carbonyloxy, cyano, sulfide and hydroxyl groups are preferred, and the hydroxyl group is more preferred.

As the fluorine-free organic material, there may be mentioned polyamide resins, polyolefin resins, vinyl chloride-based resins, polyurethane resins, polyester resins, polyaramid resins, polyimide resins, polyamideimide resins, polyphenylene oxide resins, polyacetal resins, polycarbonate resins, acrylic resins, styrenic resins, acrylonitrile/butadiene/styrene resins [ABS], cellulosic resins, polyetheretherketone resins [PEEK], polysulfone resins, polyethersulfone resins [PES], polyetherimide resins and like resins which are excellent in mechanical strength and can perform major roles in providing pressure resistance and maintaining the shape of moldings (hereinafter referred to as "structural element resins") as well as ethylene/vinyl alcohol copolymer-based resins, polyphenylene sulfide resins, polybutylene naphthalate resins, polybutylene terephthalate resins, polyphthalamides [PPA] and like resins which are high in fuel and gas impermeability performance (hereinafter referred to as "impermeable resins").

Preferred among the above-mentioned fluorine-free organic material is one comprises at least one species selected from the group consisting of polyamide resins and polyolefin resins.

When it has the layer (A) made of such a structural element resin as mentioned above, the laminate of the invention becomes excellent in mechanical strength and, when it has the layer (E) made of such an impermeable resin as mentioned above, it becomes excellent in a fuel impermeability.

The polyamide resins mentioned above each is based on a polymer having amide bond [—NH—C(=O)—] as a repeating unit within the molecule.

The polyamide resins may be either a so-called nylon resins each based on a polymer in which the intramolecular amide bond is bound to an aliphatic structure(s) and/or an alicyclic structure(s), or a so-called aramid resins in which the intramolecular amide bond is bound to aromatic structures.

The nylon resins are not particularly restricted but include, among others, those based on nylon 6, nylon 66, nylon 11, nylon 12, nylon 610, nylon 612, nylon 6/66, nylon 66/12, nylon 46, metaxylylenediamine/adipic acid copolymers or the like polymers; two or more of these may also be used in combination.

The aramid resins are not particularly restricted but include, for example, polyparaphenylene terephthalamide, polymetaphenylene isophthalamide and the like.

The polyamide resins mentioned above may also comprise macromolecules resulting from block copolymerization or graft copolymerization of a structure having no amide bond as a repeating unit onto part(s) of the polyamide molecules. As such polyamide resins, there may be mentioned, for example, those based on nylon 6/polyester copolymers, nylon 6/polyether copolymers, nylon 12/polyester copolymers, nylon 12/polyether copolymers and like polyamide elastomers. These polyamide elastomers are obtained by block copolymerization of nylon oligomers and polyester oligomers via an ester bond or bonds or by block copolymerization of nylon oligomers and polyether oligomers via an ether bond or bonds. As the polyester oligomers, there may be mentioned, for example, polycaprolactone and polyethylene adipate and, as the polyether oligomers, there may be mentioned, for example, polyethylene glycol, polypropylene glycol and polytetramethylene glycol. Preferred as the above-mentioned polyamide elastomers are nylon 6/polytetramethylene glycol copolymers and nylon 12/polytetramethylene glycol copolymers.

Preferred among the polyamide resins mentioned above are nylon 6, nylon 66, nylon 11, nylon 12, nylon 610, nylon 612, nylon 6/66, nylon 66/12, nylon 6/polyester copolymers, nylon 6/polyether copolymers, nylon 12/polyester copolymers and nylon 12/polyether copolymers, among others, since a layer made of such the polyamide resin, even when it is thin, can provide a sufficient level of mechanical strength; two or more of these may also be used in combination.

The polyolefin resins mentioned above are resins comprising fluorine atom-free vinyl group-containing monomer-derived monomer units. The fluorine-free vinyl group-containing monomer units are not particularly restricted but those having such the polar functional group as mentioned above are preferred for intended uses where interlaminar adhesion strength is required.

The polyolefin resins mentioned above are not particularly restricted but include, among others, polyolefins such as polyethylene, polypropylene and high-density polyolefins and, further, modified polyolefins obtained by modification of the above-mentioned polyolefins as modified with maleic anhydride etc., epoxy-modified polyolefins, amine-modified polyolefins and so forth.

The above-mentioned fluorine-free organic material may contain one or more of various additives such as, for example, heat stabilizers, other stabilizers, reinforcing agents, fillers, ultraviolet absorbers and pigments as added thereto each in an amount not defeating the objects of the present invention. Such additives can improve the fluorine-free organic material mentioned above in thermal stability, surface hardness, wear resistance, antistatic properties, weathering resistance and other properties.

The polyamide resins mentioned above preferably have an amine value of 10 to 80 (equivalents/$10^6$ g). When the amine value is within the range mentioned above, good interlaminar adhesion can be obtained even in the case of coextrusion under relatively low temperature conditions. If the amine value is lower than 10 (equivalents/$10^6$ g), insufficient interlaminar adhesion strength may result. If it is in excess of 80 (equivalents/$10^6$ g), the laminate obtained will be insufficient in mechanical strength and tends to discolor during storage, hence will be poor in a handling properties. A preferred lower limit is 15 (equivalents/$10^6$ g), a preferred upper limit is 60 (equivalents/$10^6$ g) and a more preferred upper limit is 50 (equivalents/$10^6$ g).

The amine value so referred to herein is a value obtained by dissolving 1 g of the polyamide resin in 50 ml of m-cresol with heating and titrating the solution with a 1/10 N aqueous solution of p-toluenesulfonic acid using thymol blue as an indicator and, unless otherwise specified, it means the amine value of the polyamide resin prior to lamination. The amino groups which the polyamide resin before lamination has are considered to be partly consumed in adhesion to a adjacent layer. Since, however, the number of amino groups consumed in such a way is very small relative to the total content thereof, the amine value of the polyamide resin before lamination is substantially the same as the amine value thereof in the laminate of the invention.

The laminate of the invention may have an adhesive layer (S) and, when it has the adhesive layer (S), the interlaminar adhesion is improved.

As typical examples of the adhesive layer (S), there may be mentioned adhesive function group-containing TFE/Et/HFP copolymers, functional group-modified polyethylene species and nylons having high amine value, and the adhesive layer can be properly selected according to the property of two layers to be bonded together.

Among the layers constituting the laminate of the invention, at least one layer preferably has a fuel permeability coefficient of not higher than 0.5 g·mm/m$^2$/day. At least one of the CTFE copolymer layer (C) and the fluorine-containing ethylenic polymer layer (J) preferably has a fuel permeability coefficient of not higher than 0.4 g·mm/m$^2$/day.

The fuel permeability coefficient so referred to herein is a value determined by mounting a sheet obtained from the measurement target resin in a cup for the fuel permeability coefficient measurement containing an isooctane/toluene/ethanol mixed solvent prepared by mixing together isooctane, toluene and ethanol in a volume ratio of 45:45:10 and measuring a changes in mass at 60° C., followed by calculation.

The laminate of the invention preferably has a fuel permeation rate of not higher than 2.5 g·mm/m$^2$/day.

The laminate of the invention, for which the fuel permeation rate is within the above range, can have a high level of resistance to fuel permeation. So long as the fuel permeation rate is within the above range, a lower limit thereto may be set at 0.1 g/m$^2$/day. A more preferred upper limit thereto is 2.0 g/m$^2$/day and a still more preferred upper limit thereto is 1.0 g/m$^2$/day.

The fuel permeation rate so referred to herein is the mass of a fuel permeating per unit area per day and is a value obtained by measuring the mass of permeation of an isooctane/toluene/ethanol mixed solvent [CE10] composed of isooctane, toluene and ethanol in a volume ratio of 45:45:10 at 60° C. according to SAE J 1737.

The fluorine-containing ethylenic polymer layer (J) constituting the laminate of the invention may have a single layer structure made of one fluorine-containing ethylenic polymer or a multilayer structure consisting of two or more layers made of one or two or more fluorine-containing ethylenic polymers. For example, it may consist of such two layers as the layer (P) and the layer (F). As the laminate of the invention, there may be mentioned, for example, a laminate consisting of two to five layers.

As preferred layer constitution examples of the laminate having a two-layer structure, there may be mentioned, in the order from the liquid-contacting side, the layer (C)/layer (P), layer (P)/layer (C) and layer (C)/layer (A) structures, among others.

Among these, the layer (C)/layer (P) and layer (P)/layer (C) layer constitutions are suited for use as liquid chemical tubes in the field of semiconductor manufacture, while the layer (C)/layer (A) laminate constitution is suited for use as a fuel tube and further can be used as a brake hose with a metal braid.

As preferred layer constitution examples of the laminate having the three-layer structure, there may be mentioned the layer (P)/layer (C)/layer (A), layer (C)/layer (E)/layer (A), layer (P)/layer (C)/layer (P) and layer (C)/layer (A)/layer (C) structures, among others.

Among these, the layer (P)/layer (C)/layer (A) and layer (C)/layer (E)/layer (A) laminate constitutions are suited for use as fuel tubes and liquid chemical tubes required to have chemical resistance, the layer (P)/layer (C)/layer (P) laminate constitution is excellent in a solvent resistance and therefore is suited for use as an in-tank tube or as an inner tube in an underground tube, and the layer (C)/layer (A)/layer (C) laminate constitution can prevent water absorption by the fluorine-free resin and can be improved in environment resistance and therefore is suited for use as a fuel tube or a liquid chemical tube.

As preferred layer constitution examples of the laminate having a four-layer structure, there may be mentioned the layer (P)/layer (E)/layer (C)/layer (A), layer (P)/layer (S)/layer (C)/layer (A), layer (P)/layer (C)/layer (S)/layer (A), layer (P)/layer (C)/layer (E)/layer (A), layer (P)/layer (C)/layer (A)/layer (C), layer (C)/layer (E)/layer (S)/layer (A), layer (C)/layer (S)/layer (E)/layer A), layer (C)/layer (E)/layer (C)/layer (A) and layer (C)/layer (E)/layer (A)/layer (C) structures, among others.

These four-layer structure laminates are suited for use as fuel tubes and liquid chemical tubes.

As preferred layer constitution examples of the laminate having the five-layer structure, there may be mentioned the layer (C)/layer (S)/layer (E)/layer (S)/layer (A), layer (P)/layer (C)/layer (A)/layer (C)/layer (P), layer (P)/layer (C)/layer (E)/layer (S)/layer (A), layer (P)/layer (C)/layer (E)/layer (C)/layer (A) and layer (P)/layer (C)/layer (E)/layer (A)/layer (C) structures, among others.

Among these, the layer (C)/layer (S)/layer (E)/layer (S)/layer (A) laminate constitution is suited for use as fuel tubes or liquid chemical tubes, the layer (P)/layer (C)/layer (A)/layer (C)/layer (P) laminate constitution is suited for use as an inner tube in an underground tube, and the layer (P)/layer (C)/layer (E)/layer (S)/layer (A), layer (P)/layer (C)/layer (E)/layer (C)/layer (A) and layer (P)/layer (C)/layer (E)/layer (A)/layer (C) laminate constitutions have high levels of liquid chemical resistance and fuel impermeability and therefore are suited for use as a liquid chemical tube or a fuel tube.

The above-mentioned layer (P), layer (C), layer (A), layer (E) and layer (S) each may have a single layer structure or a multilayer structure comprising two or more layers. For example, when the layer (P) has a multilayer structure comprising two or more layers, it may comprise a layer made of the fluorine-containing ethylenic polymer with such an electrically conductive filler as mentioned above incorporated therein and a layer made of the fluorine-containing ethylenic polymer containing no conductive filler.

The laminate of the invention may further comprise a layer other than the above-mentioned layer (P), layer (C), layer (A), layer (E) and layer (S). The other layer is not particularly restricted but there may be mentioned, for example, a protective layer, a colored layer, a marking layer, and a dielectric layer for antistatic, among others; the protective layer and/or the dielectric layer, among others, preferably constitutes the outermost layer of the laminate in view of the function thereof.

A laminate of the invention is a laminate comprising the CTFE copolymer layer (C) and the fluorine-free organic material layer (K).

In the laminate mentioned above, the layer (C) and layer (K) may each have a single-layer structure or a multilayer structure comprising two or more layers. When the layer (K) has a multilayer structure, the structure may be, for example, one resulting from lamination of the layer (A) and the layer (E).

A laminate of the invention has the layer (C) and layer (K) and it may further have at least one other layer. The other layer may be, for example, a flexible layer made of an elastomer, for instance, and capable or protecting the laminate against vibrations and shocks. The elastomer may be a thermoplastic elastomer, for example at least one species selected from the group consisting of polyamide elastomers, polyurethane elastomers, polyester elastomers, polyolefin elastomers, styrene/butadiene copolymer based elastomers and polyvinyl chloride based elastomers.

A laminate of the invention is also preferably a laminate comprising the CTFE copolymer layer (C), the fluorine-free organic material layer (K) and, further, the fluorine-containing ethylenic polymer layer (J).

Further, A laminate of the invention may comprise a layer (D) made of a fluorine-free organic material (Q) between the layer (C) and layer (J) mentioned above.

The fluorine-free organic material (Q) in the layer (D) mentioned above may be the same as the fluorine-free organic material forming the layer (K) or different therefrom; it is preferably the same as the latter, however, and more preferably is a polyamide resin. The provision of the layer (D) makes it possible to apply a technique of multilayer coextrusion molding with ease and, in addition, increase the line speed and improve a moldability. Even when the layer (J) is made of a non-perfluorinated fluororesin such as the copolymer (IV) mentioned above, multilayer coextrusion molding is possible and the line speed can be increased.

As a laminate of the invention, there may also be mentioned, among others, a laminate composed of the layer (J), the layer (C) and the layer (K) bonded together in that order, a laminate composed of the layer (J), the layer (C), the layer (K) and the layer (J) bonded together in that order, a laminate composed of the layer (J), layer (D), layer (C) and layer (K) bonded together in that order, laminated composed of the layer (J), the layer (C), the layer (K), the layer (C) and the layer (J) bonded together in that order, and a laminate composed of the layer (J), the layer (D), the layer (C), the layer (K) and the layer (J) bonded together in that order.

The layer (J), layer (C), layer (K) and layer (D) mentioned above each may have a single-layer structure or a multilayer structure comprising two or more layers.

When the layer (J) has a multilayer structure comprising two or more layers, the layer (J) may comprise a layer made of the fluorine-containing ethylenic polymer containing the above-mentioned conductive filler incorporated therein and a layer made of a fluorine-containing ethylene polymer containing no conductive filler.

When the laminate of the invention comprises the layer (D) made of fluorine-free organic material (Q) between the layer (C) and the layer (J), the layer (D) is preferably in contact with the layer (C) and layer (J), and the layer (C) is preferably in contact with the layer (K).

In the laminate of the invention, it is not always necessary that the boundary between adjacent layers in contact with each other be distinct. Thus, the boundary may show a layer structure having concentration gradients resulting from mutual penetration, from the contact surface, of the molecular chains of the polymers constituting the adjacent layers.

In the laminate of the invention, the layer (C) is preferably in contact with the layer (J) and layer (K). When the CTFE copolymer in the layer (C) contains the adhesive functional groups mentioned above, an adhesion to the layer (J) and layer (K) can be made excellent. When the layer (J) is in contact with the layer (C), both the layers can show a sufficient level of adhesion owing to the compatibility between the CTFE copolymer and fluorinated ethylenic polymer without introduction of the above-mentioned adhesive functional groups. From an improved adhesion viewpoint, however, it is preferred that the CTFE copolymer in the layer (C) be an adhesive functional group-containing one. When the adhesive functional group-containing CTFE copolymer is used, a sufficient level of interlaminar adhesion can be attained even if the fluorinated ethylenic polymer in the layer (J) is one having no adhesive functional groups introduced therein.

As for the method of molding the laminate of the invention, there may be mentioned, for example, (1) the method comprising molding respective laminate-constituting layers by coextrusion in a molten state (coextrusion molding) to thereby form a laminate having a multilayer structure to thereby attain thermal fusion bonding (melt adhesion) among layers in one step.

As other methods of molding the laminate of the invention in addition to the above (1), there may be mentioned, among others, (2) the method comprising placing respective layers prepared separately using extruders one on top of the other, followed by interlaminar adhesion by thermal fusion, (3) the method comprising forming a laminate by extruding, through an extruder, a molten resin onto the surface of a layer prepared in advance, and (4) the method comprising applying, in the manner of electrostatic coating, a polymer to constitute a adjacent layer onto the surface of a layer prepared in advance and heating the thus-obtained coated matter collectively or from the coated side to thereby form a layer by thermal melting of the polymer subjected to coating.

When the laminate of the invention is a tube or hose, there may be mentioned, for example, (2a) the method which corresponds to the above-mentioned method (2) and comprises separately forming respective cylindrical layers using extruders and covering the layer to become an inner layer with a adjacent layer by means of a heat-shrinkable tube, (3a) the method which corresponds to the above-mentioned method (3) and comprises first forming a layer to become an inner layer using an inner layer extruder and forming a layer coming in contact with the inner layer on the peripheral surface thereof using an outer layer extruder, and (4a) the method which corresponds to the above-mentioned method (4) and comprises applying, in the manner of electrostatic coating, a polymer to constitute an inner layer to the inside of a layer to come into contact with the inner layer and placing the coated matter in a heating oven to heat the same as a whole or inserting a rod-shaped heating device into the cylindrical coated article and heating the same from the inside, to thereby mold the inner layer by melting the inner layer-constituting polymer by heating.

When materials for the respective layers constituting the laminate of the invention are coextrudable, it is a general practice to mold the laminate by the above-mentioned coextrusion method (1). As the techniques of the coextrusion molding mentioned above, there may be mentioned those multilayer coextrusion methods which are known in the art, for example the multi-manifold method and feed block method.

In the above-mentioned molding methods (2) and (3), the surface of a layer to come into contact with another layer may be subjected to surface treatment so that the interlaminar adhesion may be enhanced. As such surface treatment, there may be mentioned etching treatment such as sodium etching treatment; corona treatment; and plasma treatment such as low-temperature plasma treatment.

Preferred as the method of molding are the above-mentioned method (1) and the above-mentioned methods (2) and (3) in which lamination is carried out after surface treatment. Most preferred is the method (1), however.

Also employable as a method of molding the laminate of the invention is a molding method comprising subjecting a plurality of materials to rotational molding in multi-divided stages. In that case, it is not always necessary for the melting point constituting the outermost layer to be higher than that of those of the inner layer material or materials; the melting point of each inner layer material may be higher by 100° C. than the melting point of the outermost layer material. In that case, a heating means is preferably provided within the inside as well.

The laminate of the invention can have various shapes such as film-like, sheet-like, tube-like, hose-like, bottle-like and tank-like shapes. The film-like, sheet-like, tube-like and hose-like shapes may also be wavy, corrugated or convoluted shapes, for instance.

When the laminate of the invention is a tube or hose having a plurality of such wavy annular folds in a region thereof, it can be compressed on one annular side in that region and elongated on the other side outwardly and therefore can be bent at any angle with ease without accompanying stress fatigue or delamination.

The method of shaping the wavy region is not restricted but the region can be easily shaped by first molding a straight tube and then subjecting the same to mold forming, for instance, to a desired wavy shape.

The laminate of the invention can be used in the following fields of application.

Films, sheets; films for foods, sheets for foods, films for drugs, sheets for drugs, diaphragms for diaphragm pumps, and various packing members;

Tubes, hoses; fuel tubes and fuel hoses such as tubes for automobile fuel lines or hoses for automobile fuel lines, tubes for solvent transfer or hoses for solvent transfer, tubes for paint transfer or hoses for paint transfer (inclusive for use in printers), automotive radiator hoses, air conditioner hoses, brake hoses, electric wire coverings, tubes for food or drink transfer or hoses for food or drink transfer, underground tubes or hoses in gasoline stations, tubes or hoses for seabed oil fields (including injection tubes and crude oil transfer tubes), etc.

Bottles, containers, tanks; automotive radiator tanks, gasoline tanks and other fuel tanks, solvent tanks, paint tanks, liquid chemical tanks for use in semiconductor manufacture and like liquid chemical tanks, food or drink tanks, etc.

Others; carburetor flange gaskets, fuel pump O rings and other various seals for use in automobiles, hydraulic system seals and other various seals in machinery, gears, tubes for medical use (including catheters), cable ducts, etc.

The laminate of the invention can be suitably used as tubes, hoses and tanks and in like fields of use where the contact with inflammable liquids such as fuels is unavoidable. In this case, a layer to come into contact with such a liquid is preferably the layer (C) and, when there is the layer (J), it is preferably the layer (J). When the layer (J) is the inside layer, the layer (C) serves an intermediate layer and the layer (K) as an outer layer since the area coming into contact with a liquid is generally the inside layer. The terms "inside or inner layer", "intermediate layer" and "outside or outer layer" are used herein to mean only that, referring to such shapes as tubes, hoses and tanks for which there are concepts of inside and outside, either of the above-mention layer (J) and layer (K) is on the inner side and the other on the outer side or a layer occurs between these two layers; thus, the laminate mentioned above may have one or more other layers on that surface out of both surfaces of the layer (C) which is opposite to the layer (J) surface in contact therewith and/or between the layer (J) and the layer (C) and/or between the layer (C) and the layer (K) and/or on that surface out of both surfaces of the layer (K) which is opposite to the layer (C) surface in contact therewith.

The term "intermediate layer" as used herein conceptually refers to a layer occurring between the above-mentioned inside or inner layer and the above-mentioned outside or outer layer.

When the laminate of the invention is in contact with an inflammable liquid such as gasoline, an electrostatic charge accumulation tends to occur with ease as a result of contact with the inflammable liquid; for avoiding the inflammation possibly caused by this electrostatic charge, the layer coming into contact with such a liquid preferably contains a conductive filler.

When, in the laminate of the invention, the layer (J) is an area coming into contact with a liquid, the layer (J) may be a layer whose innermost layer made of the fluorine-containing ethylenic polymer with the conductive filler incorporated herein, or a layer having a multilayer structure comprising a layer made of a fluorine-containing ethylenic polymer containing no conductive filler on the outer side of such innermost layer. The latter innermost layer and the fluorine-containing ethylenic polymer composition layer containing no conductive filler may be in contact with each other. The laminate of the invention can be further improved in liquid chemical resistance by applying the layer (J) as the innermost layer and as the outermost layer.

The above-mentioned laminate to serve as the fuel tube also constitutes an aspect of the invention.

The laminate of the invention is excellent in the fuel impermeability and environmental cracking resistance for a fuel, as mentioned above, and therefore can be suitably used as a laminated fuel tube for use as a fuel tube.

While a preferred layer constitution of the laminate of the invention is not particularly restricted, the following ones, for example, may be mentioned since they are particularly suited for use as fuel tubes:

Laminates consisting of:
Layer 1: Layer made of the adhesive functional group-containing CTFE copolymer, and
Layer 2: Layer made of the polyamide rein;
Laminates consisting of:
Layer 1: Layer made of the adhesive functional group-containing CTFE copolymer,
Layer 2: Layer made of the adhesive functional group-containing CTFE copolymer, and
Layer 3: Layer made of the polyamide resin; and
Laminates consisting of:
Layer 1: Layer made of the adhesive functional group-containing CTFE copolymer,
Layer 2: Layer made of the ethylene/vinyl alcohol copolymer,
Layer 3: Layer made of the modified polyolefin resin, and
Layer 4: Layer made of the high-density polyolefin resin.

As preferred examples of a layer constitution of the laminate of the invention, there may also be mentioned laminates consisting of:

Layer 1: Layer made of the fluorine-containing ethylenic polymer (optionally with the conductive filler incorporated therein),
Layer 2: Layer made of the CTFE copolymer, and
Layer 3: Layer made of the polyamide resin and, among them, there may particularly be mentioned laminates consisting of:
Layer 1: Layer made of the copolymer (III) (optionally with the conductive filler incorporated therein),
Layer 2: Layer made of the adhesive functional group-containing CTFE copolymer, and
Layer 3: Layer made of the polyamide resin.

As further preferred examples of the layer constitution of the laminate of the invention, there may be mentioned laminates consisting of:
Layer 1: Layer made of the fluorine-containing ethylenic polymer (optionally with the conductive filler incorporated therein),
Layer 2: Layer made of the polyamide resin,
Layer 3: Layer made of the CTFE copolymer, and
Layer 4: Layer of the polyamide resin and, among them, there may particularly be mentioned laminates consisting of:
Layer 1: Layer made of the copolymer (IV) (optionally with the conductive filler incorporated therein),
Layer 2: Layer made of the polyamide resin,
Layer 3: Layer made of the adhesive functional group-containing CTFE copolymer, and
Layer 4: Layer made of the polyamide resin; more preferred among them are laminates consisting of:
Layer 1: Layer made of the copolymer (IV-II) (optionally with the conductive filler incorporated therein),
Layer 2: Layer made of the polyamide resin,
Layer 3: Layer made of the adhesive functional group-containing CTFE copolymer, and
Layer 4: Layer made of the polyamide resin.

The respective layers of the above-mentioned tubes for use as fuel tubes are bonded together in order of the layer number, preferably with Layer 1 as the innermost layer.

Preferred Embodiment

The following examples illustrate the present invention in further detail. These examples are, however, by no means limitative of the scope of the invention.

Synthesis Example 1

A jacketed polymerization vessel equipped with a stirrer and having a capacity for 174 kg of water was charged with 51.5 kg of demineralized pure water, the internal space gaseous phase was sufficiently substituted with pure nitrogen gas, and the nitrogen gas was then removed by evacuation. Then, 40.6 kg of octafluorocyclobutane, 1.3 kg of chlorotrifluoroethylene [CTFE], 4.5 kg of tetrafluoroethylene [TFE] and 2.8 kg of perfluoro(propyl vinyl ether) [PPVE] were fed into the vessel under pressure. n-Propyl alcohol [PrOH] (0.075 kg) was added as a chain transfer agent, the temperature was adjusted to 35° C., and stirring was started. Thereto was added 0.44 kg of a 50% (by mass) solution of di-n-propyl peroxydicarbonate [NPP] in methanol as a polymerization initiator to start the polymerization. During the polymerization, a monomer mixture prepared so as to have the same composition as the desired copolymer composition was additionally fed to maintain the vessel inside pressure at 0.66 MPa. After the polymerization, the residual gas in the vessel inside was discharged by evacuation, and the polymer formed was taken out, washed with demineralized pure water and dried to give 30.5 kg of a CTFE copolymer as a granular powder. The copolymer was then melt-kneaded on a φ 50 mm single-screw extruder at a cylinder temperature of 290° C. to give pellets. The CTFE copolymer obtained in the form of pellets was then heated at 190° C. for 24 hours.

Synthesis Example 2

The polymerization procedure of Synthesis Example 1 was followed in the same manner except that the initial monomer and chain transfer agent amounts and the initiator amount charged were as follows: 1.4 kg of chlorotrifluoroethylene [CTFE], 4.5 kg of tetrafluoroethylene [TFE], 2.8 kg of perfluoro(propyl vinyl ether) [PPVE], 0.042 kg of [PrOH], and 0.44 kg of a 50% (by mass) solution of [NPP] in methanol; 28.4 kg of a CTFE copolymer was obtained as a granular powder. Further, pellets were obtained by following the same melt kneading and heating procedure as in Examples 1.

Synthesis Example 3

The polymerization procedure of Synthesis Example 1 was followed in the same manner except that the initial monomer and chain transfer agent amounts and the initiator amount charged were as follows: 1.1 kg of chlorotrifluoroethylene [CTFE], 4.5 kg of tetrafluoroethylene [TFE], 2.8 kg of perfluoro(propyl vinyl ether), 0.080 kg of [PrOH], and 0.44 kg of a 50% (by mass) solution of [NPP] in methanol; 30.5 kg of a CTFE copolymer was obtained as a granular powder. Further, pellets were obtained by following the same melt kneading and heating procedure as in Examples 1.

Synthesis Example 4

The polymerization procedure of Synthesis Example 1 was followed in the same manner except that the initial monomer and chain transfer agent amounts and the initiator amount charged were as follows: 1.6 kg of chlorotrifluoroethylene [CTFE], 4.5 kg of tetrafluoroethylene [TFE], 2.8 kg of perfluoro(propyl vinyl ether), 0.090 kg of [PrOH], and 0.44 kg of a 50% (by mass) solution of [NPP] in methanol; 30.5 kg of a CTFE copolymer was obtained as a granular powder. Further, pellets were obtained by following the same melt kneading and heating procedure as in Examples 1.

Synthesis Example 5

A jacketed polymerization vessel equipped with a stirrer and having a capacity for 174 kg of water was charged with 51.5 kg of demineralized pure water, the internal space gaseous phase was sufficiently substituted with pure nitrogen gas, and the nitrogen gas was then removed by evacuation. Then, the polymerization vessel inside pressure was raised to 0.67 MPa by feeding of 87 kg of octafluorocyclobutane, 8.4 kg of chlorotrifluoroethylene [CTFE] and tetrafluoroethylene [TFE] and, thereafter, 4.3 kg of perfluoro(propyl vinyl ether) [PPVE] was fed, 0.13 kg of n-propyl alcohol [PrOH] was added as a chain transfer agent, the temperature was adjusted to 35° C., and stirring was started. Thereto was added 0.2 kg of a 50% (by mass) solution of di-n-propyl peroxydicarbonate [NPP] in methanol as a polymerization initiator to start the polymerization. During the polymerization, a monomer mixture prepared so as to have the same composition as the desired copolymer composition was additionally fed to maintain the vessel inside pressure at 0.67 MPa. After the polymerization, the residual gas in the vessel inside was discharged by evacuation, and the polymer formed was taken out, washed with demineralized pure water and dried to give 20 kg of a CTFE copolymer as a granular powder. The copolymer was then melt-kneaded on a φ 50 mm single-screw extruder at a cylinder temperature of 270° C. to give pellets. The CTFE copolymer obtained in the form of pellets was then heated at 190° C. for 24 hours.

Synthesis Example 6

The polymerization procedure of Synthesis Example 1 was followed in the same manner except that the initial monomer and chain transfer agent amounts and the initiator amount charged were as follows: 1.3 kg of chlorotrifluoroethylene [CTFE], 4.5 kg of tetrafluoroethylene [TFE], 2.8 kg of perfluoro(propyl vinyl ether), 0.020 kg of [PrOH], and 0.44 kg of a 50% (by mass) solution of [NPP] in methanol; 30.5 kg of a CTFE copolymer was obtained as a granular powder. Further, pellets were obtained by following the same melt kneading and heating procedure as in Examples 1.

Synthesis Example 7

The polymerization procedure of Synthesis Example 1 was followed in the same manner except that the initial monomer and chain transfer agent amounts and the initiator amount charged were as follows: 1.3 kg of chlorotrifluoroethylene [CTFE], 4.5 kg of tetrafluoroethylene [TFE], 2.8 kg of perfluoro(propyl vinyl ether), 0.108 kg of [PrOH], and 0.44 kg of a 50% (by mass) solution of [NPP] in methanol; 30.5 kg of a CTFE copolymer was obtained as a granular powder. Further, pellets were obtained by following the same melt kneading and heating procedure as in Examples 1.

Synthesis Example 8

The polymerization procedure of Synthesis Example 1 was followed in the same manner except that the initial monomer and chain transfer agent amounts and the initiator amount charged were as follows: 1.0 kg of chlorotrifluoroethylene [CTFE], 4.5 kg of tetrafluoroethylene [TFE], 2.8 kg of perfluoro(propyl vinyl ether) [PPVE], 0.110 kg of [PrOH], and 0.44 kg of a 50% (by mass) solution of [NPP] in methanol; 30.5 kg of a CTFE copolymer was obtained as a granular powder. Further, pellets were obtained by following the same melt kneading and heating procedure as in Examples 1.

Synthesis Example 9

A jacketed polymerization vessel equipped with a stirrer and having a capacity for 174 kg of water was charged with 51.5 kg of demineralized pure water, the internal space gaseous phase was sufficiently substituted with pure nitrogen gas, and the nitrogen gas was then removed by evacuation. Then, the polymerization vessel inside pressure was raised to 0.67 MPa by feeding of 87 kg of octafluorocyclobutane, 8.4 kg of chlorotrifluoroethylene [CTFE] and tetrafluoroethylene [TFE] and, thereafter, 4.3 kg of perfluoro(propyl vinyl ether) [PPVE] was fed. The temperature was adjusted to 35° C., and stirring was started. Thereto was added 0.2 kg of a 50% (by mass) solution of di-n-propyl peroxydicarbonate [NPP] in methanol as a polymerization initiator to start the polymerization. During the polymerization, a monomer mixture prepared so as to have the same composition as the desired copolymer composition was additionally fed to maintain the vessel inside pressure at 0.67 MPa. After the polymerization, the residual gas in the vessel inside was discharged by evacuation, and the polymer formed was taken out, washed with demineralized pure water and dried to give 20 kg of a CTFE copolymer as a granular powder. The copolymer was then melt-kneaded on a ϕ 50 mm single-screw extruder at a cylinder temperature of 270° C. to give pellets. The CTFE copolymer obtained in the form of pellets was then heated at 190° C. for 24 hours.

The copolymers obtained in the above synthesis examples were subjected to physical properties evaluation by the methods mentioned below. The results are shown in Table 2.

(1) Determination of Number of Carbonate Groups

Each copolymer in the form of a white powder or cut pieces of melt-extruded pellets thereof was compression-molded at room temperature to give a 50- to 200-μm-thick film. When such a film is analyzed by infrared absorption spectrophotometry, a peak appears at an absorption wavelength of 1817 cm$^{-1}$ [ν(C═O)] due to the carbonyl group in the carbonate group [—OC(═O)O—]. Therefore, the absorbance of that ν(C═O) peak was measured, and the number in question per $10^6$ main chain carbon atoms in the copolymer was calculated according to the following formula:

$$\text{Number of terminal groups}(\text{per}1\times10^6\text{carbon atoms})=(l\times K)/t$$

where:
l: absorbance,
K: Correction factor (—OC(═O)O—R: 1426),
t: Film thickness (mm).

The infrared absorption spectrophotometry was carried out by 40 repetitions of scanning using a Perkin-Elmer model 1760xFT-IR spectrometer (product of Perkin-Elmer). The baseline of the IR spectrum obtained was automatically judged by means of Perkin-Elmer Spectrum for windows Ver. 1.4C, and the absorbance of the peak at 1817 cm$^{-1}$ was thus measured. The film thickness was measured using a micrometer.

(2) Copolymer Composition Determination

The copolymer composition of each synthesis example was determined based on the results of $^{19}$F-NMR spectrometry and the chlorine content obtained upon elemental analysis.

(3) Melting Point (Tm) Determination

The melting peak was recorded using a Seiko model differential scanning calorimeter [DSC] at a programming rate of 10° C./minute, and the temperature corresponding to the maximum value was reported as the melting point (Tm).

(4) Fluororesin Melt Flow Rate (MFR) Measurement

Using a melt indexer (product of Toyo Seiki Seisakusho), the mass (g) of each polymer allowed to flow out, per unit time (10 minutes), through a nozzle with an inside diameter of 2 mm and a length of 8 mm under a load of 5 kg at a measurement temperature of 297° C. was measured.

(5) Fuel Permeability Coefficient Determination for Each Single Layer

Each copolymer, in pellet form, to be used in forming each layer of a tubular laminate was placed in a mold with a diameter of 120 mm, the whole was set on a press heated at 300° C. and melt-pressed at a pressure of about 2.9 MPa to give a 0.15-mm-thick sheet. The sheet was mounted in a SUS 316 cup (40 mm ϕ in inside diameter and 20 mm in height) for permeability coefficient measurement containing 18 ml of CE10 (fuel prepared by blending 10% by volume of ethanol with a mixture of isooctane and toluene in a volume ratio of 50:50), and the changes in mass were measured at 60° C. for 1000 hours. The fuel permeability coefficient (g·mm/m$^2$/day) was calculated from the hourly change in mass, the sheet surface area in contact with the liquid and the sheet thickness. The result is shown in Table 2.

TABLE 2

| | CTFE mol % | TFE mol % | PPVE mol % | Melting point ° C. | MFR g/10 min | Number of carbonate groups per $10^6$ main chain carbon atoms | Fuel permeability coefficient (g · mm/m$^2$/day) |
|---|---|---|---|---|---|---|---|
| Synthesis Example 1 | 21.3 | 76.3 | 2.4 | 246 | 29.2 | 180 | 0.32 |
| Synthesis Example 2 | 22.5 | 75.0 | 2.5 | 245 | 19.2 | 130 | 0.34 |
| Synthesis Example 3 | 17.0 | 80.6 | 2.4 | 253 | 23.0 | 182 | 0.36 |
| Synthesis Example 4 | 24.4 | 73.1 | 2.5 | 241 | 37.5 | 175 | 0.33 |
| Synthesis Example 5 | 60.5 | 38.0 | 1.5 | 200 | 30.0 | 198 | 0.22 |
| Synthesis Example 6 | 20.3 | 77.3 | 2.4 | 245 | 12.0 | 148 | 0.33 |
| Synthesis Example 7 | 21.3 | 76.3 | 2.4 | 244 | 50.0 | 188 | 0.35 |
| Synthesis Example 8 | 14.1 | 83.5 | 2.4 | 255 | 31.0 | 170 | 0.48 |
| Synthesis Example 9 | 60.5 | 38.0 | 1.5 | 199 | 7.5 | 182 | 0.18 |

EXAMPLES AND COMPARATIVE EXAMPLES

Using a two-resin two-layer film extruder (product of Plastic Kogaku Kenkyusho) equipped with a multimanifold, a polyamide 12 (trademark: Vestamid X7297, product of Degussa Huls Ag) for forming the outer layer and one of the CTFE copolymers of Synthesis Examples 1 to 9 for forming the inner layer were respectively fed into two extruders, and a two-resin two-layer multilayer tube with an outside diameter of 8 mm and an inside diameter of 6 mm was molded under the extrusion conditions shown in Table 3. The multilayer tube obtained was subjected to interlaminar bond strength and fuel permeation rate measurements by the methods mentioned below. The molding conditions and the evaluation results are shown in Table 3.

(A) Confirmation of High-Speed Moldability

Multilayer tubes having each constitution specified in Table 3 were molded while the line speed was varied from 5 m/min to 8 m/min and to 15 m/min. The tubes obtained were examined for the occurrence or nonoccurrence of melt fracture on the inside and on the outside. When melt fracture was found, the tube was evaluated as "X" and, when not found, as "O"; the results obtained are shown in Table 3.

Further, using a φ 45 twin-screw extruder equipped with a side feeder function, 91 parts by mass of the CTFE copolymer in pellet form as obtained in Synthesis Example 1 and 9 parts by mass of a conductive filler (acetylene black) were melt-kneaded at a cylinder temperature of 290° C. to give a conductive CTFE copolymer composition in the form of pellets. A rod specimen cut out of the strand obtained in melt flow rate measurement showed a surface resistance value of $10^5$ Ω·cm/cm. Then, the conductive CTFE copolymer composition obtained in the form of pellets was heated at 190° C. for 24 hours and evaluated also for moldability. In ordinary molding, the resin pressure becomes high because of the MFR being lowered to 5.5 by the influence of the conductive filler. In this case, it could be confirmed that tube molding without the occurrence of melt fracture becomes possible by changing the die mandrel size from 12 mm/16 mm to 22 mm/28 mm. The inner layer of a two-layer tube produced by using the above conductive CTFE copolymer composition also had a surface resistance value of $10^5$ Ω·cm/cm.

(D) Innermost Layer Surface Crack Checking Test after Immersion of the Laminate in a Fuel A 15-cm-long segment of the tubular laminate was cut lengthways and immersed in CM15 and at the same time the tube was bent to a radius of 5 cm. After 10 minutes, it was taken out of CM15 and the innermost layer surface was checked for the occurrence or nonoccurrence of cracking. The occurrence of cracking was indicated by "X", and the nonoccurrence by "O". The result is shown in Table 3.

(E) Inner Layer Material Tensile Modulus

Each of the CTFE copolymers of Synthesis Examples 1 to 9 was subjected to compression molding at a molding temperature higher by 50° C. than the melting point thereof and a molding pressure of 5 MPa. Using the thus-obtained 0.1- to 0.2-mm-thick sheet, test specimens according to ASTM D 638 were prepared. The test specimens prepared were subjected to tensile testing at a rate of 100 mm/min using a Tensilon universal testing machine for tensile modulus determination. The measurement results are shown in Table 3.

TABLE 3

| | | Example 1 | Example 2 | Example 3 | Example 4 | Comparative example 1 | Comparative example 2 | Comparative example 3 | Comparative example 4 | Comparative example 5 |
|---|---|---|---|---|---|---|---|---|---|---|
| Inner layer | Material | Synthesis Example 1 | Synthesis Example 2 | Synthesis Example 3 | Synthesis Example 4 | Synthesis Example 5 | Synthesis Example 6 | Synthesis Example 7 | Synthesis Example 8 | Synthesis Example 9 |
| | TFE (mol %) | 76.3 | 75.0 | 80.6 | 73.1 | 38.0 | 77.3 | 76.3 | 83.5 | 38.0 |
| | CTFE (mol %) | 21.3 | 22.5 | 17.0 | 24.4 | 60.5 | 20.3 | 21.3 | 14.1 | 60.5 |
| | PPVE (mol %) | 2.4 | 2.5 | 2.4 | 2.5 | 1.5 | 2.4 | 2.4 | 2.4 | 1.5 |
| | MFR (g/10 min) | 29.2 | 19.2 | 23.0 | 37.5 | 30.0 | 12.0 | 50.0 | 31.0 | 7.5 |
| | Cylinder temperature (° C.) | 260–285 | 260–285 | 260–285 | 260–285 | 260–280 | 260–285 | 260–285 | 260–285 | 260–285 |
| | Adapter temperature (° C.) | 300 | 300 | 300 | 300 | 280 | 300 | 300 | 300 | 285 |
| Outer layer | Material | PA12 | PA12 | PA12 | PA12 | PA12 | PA12 | PA12 | PA12 | PA12 |
| | Cylinder temperature (° C.) | 210–245 | 210–245 | 210–245 | 210–245 | 210–245 | 210–245 | 210–245 | 210–245 | 210–245 |
| | Adapter temperature (° C.) | 245 | 245 | 245 | 245 | 245 | 245 | 245 | 245 | 245 |
| | Die temperature (° C.) | 300 | 300 | 300 | 300 | 300 | 300 | 300 | 300 | 300 |
| Extrusion conditions | Line speed: 5 m/min | O | O | O | O | O | O | O | O | X |
| | Line speed: 8 m/min | O | O | O | O | O | X | O | O | X |
| | Line speed: 15 m/min | O | O | O | O | O | X | O | O | X |
| Water temperature (° C.) | | 10 | 10 | 10 | 10 | 10 | 10 | 10 | 10 | 10 |
| Wall thickness | Inner layer (mm) | 0.2 | 0.2 | 0.2 | 0.2 | 0.2 | 0.2 | 0.2 | 0.2 | 0.2 |
| | Outer layer (mm) | 0.8 | 0.8 | 0.8 | 0.8 | 0.8 | 0.8 | 0.8 | 0.8 | 0.8 |
| Total wall thickness (mm) | | 1 | 1 | 1 | 1 | 1 | 1 | 1 | 1 | 1 |
| Bond strength (N/cm) | | | | | | ≧30 N/cm | | | | |
| Fuel permeation rate (g/m²/day) | | O | O | O | O | O | O | O | X | O |
| Occurrence or nonoccurrence of cracking after immersion in fuel | | O | O | O | O | X | O | X | O | O |
| Inner layer tensile modulus (MPa) | | 450 | 450 | 430 | 455 | 610 | 445 | 465 | 430 | 600 |

(B) Bond Strength Measurement

Test pieces 1 cm in width were cut out from the tubular laminate and subjected to 180-degree peel testing on a Tensilon universal testing machine at a rate of 25 mm/minute, and the mean of five maximum points on an elongation-tensile strength graph was determined as the initial bond strength (N/cm). It was confirmed that the interlaminar bond strength was not lower than 30 N/cm for the tubular laminates obtained in all the examples and comparative examples.

(C) Fuel Permeation Rate Measurement of Laminate

A 40-cm-long section was cut off from the tubular laminate and fitted with a 120-ml SUS316 stainless steel reservoir tank by means of a Swagelock system, and the permeation of CE10 at 60° C. was measured according to SAE J 1737, and the fuel permeation rate (g/m²/day) was calculated using the wall thickness of the tubular laminate. When the measured rate was not higher than 2.5, the laminate was evaluated as "O" and, when it was higher than 2.5, as "X".

Table 3 indicated that, in Examples 1 to 4 in which the MFR was 15.0 to 40.0 (g/10 minutes) and the CTFE content was 15.0 to 25.0 mole percent, molding could be carried out at higher rates as compared with the comparative examples and good cracking resistance and barrier properties could be maintained. Furthermore, it was revealed that, in the composition range employed and the MFR range shown in the examples, the laminates also have such a level of flexibility of the materials themselves that is required for laying out the laminated tubes with small radii and therefore the laminates can meet the recent increasing requirement for the improvement in space efficiency in tube layout in automobiles.

INDUSTRIAL APPLICABILITY

The laminate of the invention can suitably be used, for example, as an automotive fuel tube required to be high in productivity and to have fuel impermeability as well as fuel-induced cracking resistance.

The invention claimed is:

1. A laminate comprising a chlorotrifluoroethylene copolymer layer (C) and a fluorine-free organic material layer (K),
   wherein the chlorotrifluoroethylene copolymer has a melt flow rate of 15.0 to 40.0 (g/10 minutes) and contains 15.0 to 25.0 mole percent of chlorotrifluoroethylene units relative to all monomer units, and
   the chlorotrifluoroethylene copolymer is a chlorotrifluoroethylene/tetrafluoroethylene/perfluoro(alkyl vinyl ether) copolymer.

2. A laminate according to claim 1,
   which comprises the chlorotrifluoroethylene copolymer layer (C) and the fluorine-free organic material layer (K) and, further, a fluorine-containing ethylenic polymer layer (J), the fluorine-containing ethylenic polymer being different from the chlorotrifluoroethylene copolymer of layer (C) and the layer (J), the layer (C) and the layer (K) being bonded together in that order.

3. A laminate according to claim 1, wherein the fluorine-free organic material comprises at least one species selected from the group consisting of polyamide resins and polyolefin resins.

4. A laminate according to claim 1, which is a fuel tube.

* * * * *